United States Patent
Aparin

(10) Patent No.: US 8,843,426 B2
(45) Date of Patent: Sep. 23, 2014

(54) METHOD AND APPARATUS OF PRIMARY VISUAL CORTEX SIMPLE CELL TRAINING AND OPERATION

(75) Inventor: Vladimir Aparin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 13/115,158

(22) Filed: May 25, 2011

(65) Prior Publication Data

US 2012/0303567 A1  Nov. 29, 2012

(51) Int. Cl.
G06N 3/063 (2006.01)
G06N 3/04 (2006.01)

(52) U.S. Cl.
CPC .............. G06N 3/063 (2013.01); *G06N 3/0445* (2013.01)
USPC .......................................................... 706/33

(58) Field of Classification Search
CPC .................................. G06N 3/063; G06N 3/04
See application file for complete search history.

(56) References Cited

U.S. PATENT DOCUMENTS

| 5,771,312 A * | 6/1998 | Spitzer ........................... 382/167 |
| 2002/0167615 A1* | 11/2002 | Spitzer et al. ................... 348/679 |
| 2008/0005048 A1* | 1/2008 | Weng .............................. 706/14 |
| 2012/0011088 A1* | 1/2012 | Aparin et al. .................... 706/25 |
| 2012/0011089 A1* | 1/2012 | Aparin et al. .................... 706/25 |
| 2012/0011093 A1* | 1/2012 | Aparin et al. .................... 706/33 |
| 2012/0330870 A1* | 12/2012 | Aparin ............................ 706/19 |

OTHER PUBLICATIONS

Pellegrino et al, How the Spatial Filters of Area V1 Can Be Used for a Nearly Ideal Edge Detection, 2002.*
Indiveri, A low-power adaptive integrate-and-fire neuron circuit, 2003.*
Hodgson et al, Biologically inspired image processing, 1995.*
Choi T. Y. W., et al., "A multi-chip implementation of cortical orientation hypercolumns", Proceedings / 2004 IEEE International Symposium on Circuits and Systems : May 23-26, 2004, Sheraton Vancouver Wall Centre Hotel, Vancouver, British Columbia, Canada, IEEE Oprations Center, Piscataway, NJ, May 23, 2004, pp. III-13, XP010719216, ISBN: 978-0-7803-8251-0 pp. III-13-pp. III-16, left-hand column, paragraph 2.
International Search Reprot and Written Opinion—PCT/US2012/039698—ISA/EPO—Aug. 2, 2012.
Ramos, et al.,"On Spike-Timing-Dependent-Plasticity", Memristive Devices, and Building a Self-Learning Visual Cortex, Frontiers in Neuroscience, vol. 5, Jan. 1, 2011, XP55012442.
Roka A., et al., "Edge Detection Model Based on Involuntary Eye Movements of the Eye-Retina System", Acta Polytechnica Hungarica, vol. 4, No. 1, Jan. 1, 2007, pp. 31-46, XP55033237, Retrieved from the Internet: URL:http://www.uni-obuda.hu/journal/Roka_Csapo_Resko_Baranyi_9.pdf [retrieved on Jul. 19, 2012] p. 31-p. 44, paragraph 3.

(Continued)

*Primary Examiner* — Jeffrey A Gaffin
*Assistant Examiner* — Mikayla Chubb
(74) *Attorney, Agent, or Firm* — Rupit M. Patel

(57) ABSTRACT

Certain aspects of the present disclosure present a technique for primary visual cortex (V1) cell training and operation. The present disclosure proposes a model structure of V1 cells and retinal ganglion cells (RGCs), and an efficient method of training connectivity between these two layers of cells such that the proposed method leads to an autonomous formation of feature detectors within the V1 layer. The proposed approach enables a hardware-efficient and biological-plausible implementation of image recognition and motion detection systems.

36 Claims, 7 Drawing Sheets

(56) References Cited

OTHER PUBLICATIONS

Shih-Chii Liu., "A silicon retina with controllable winner-take-all properties", Proceedings of the 2003 International Symposium on Circuits and Systems, 2003. ISCAS '03., vol. 4, Jan. 1, 2003, pp. IV-804, XP55033429, DOI: 10.1109/ISCAS.2003-1206327 ISBN: 978-0-78-037761-5 pp. IV-804-pp. IVB-807, right-hand column, paragraph 1.

Timothee Masqueli ER et al., "Unsupervised Learning of Visual Features through Spike Timing Dependent Plasticity", Trends in Neurosciences, vol. 28, No. 2, Jan. 1, 2007, p. 1, XP55033433, ISSN: 0166-2236, DOI: 0166-2236(2005)028 [ooOI: STMS] 2.0.C0;2.

Timothee Masquelier et al., "Learning complex cell invariance from natural videos: A plausability proof", Computer Science and Artificial Intelligence Laboratory Technical Report MIT-CSAIL-TR-2007-060, CBCL-269, Dec. 26, 2007, pp. 1-20, XP55033680, http : // cbcl .mit .e&/ Retrieved from the Internet : URL: http : // cbcl .mit .edu/publications/ps/MI T-CSAIL-TR-2007-060.pdf [ retrieved on Jul. 24, 2012] p. 2-p. 13 left-hand column, paragraph 3.

Vogelstein R.J. , "Reconfigurable neuromorphic microchips" In: "Towards a spinal neuroprosthesis: Restoring locomotion after spinal cord injury", May 1, 2007, Johns Hopkins University , XP55002180, pp. 74-155, p. 81-p. 147.

\* cited by examiner

METHOD AND APPARATUS OF PRIMARY VISUAL CORTEX SIMPLE CELL TRAINING AND OPERATION

BACKGROUND

1. Field

Certain aspects of the present disclosure generally relate to neural system engineering and, more particularly, to methods and apparatus for primary visual cortex simple cell training and operation.

2. Background

Image recognition and motion detection systems can be divided into those based on machine vision (i.e., Artificial Intelligence (AI)) techniques and those utilizing visual cortex techniques (i.e., biologically plausible systems). The machine vision systems have well established methods of training, but poor recognition accuracy. For example, distinguishing a dog from a cat remains a challenging task for machine vision systems with a 50/50 outcome.

On the other hand, biologically plausible systems use a human visual cortex structure. Methods based on these systems promise to be more accurate than the machine vision systems. However, the training methods for biologically plausible systems that lead to their self-organization are not well developed. This is due to a poor understanding of the visual cortex organization and self-training methods.

SUMMARY

Certain aspects of the present disclosure provide an electrical circuit. The electrical circuit generally includes a plurality of Retinal Ganglion Cell (RGC) circuits, wherein each of the RGC circuits generates, at an output, a sum of weighted inputs from receptor circuits associated with that RGC circuit, a plurality of primary visual cortex cell (V1) circuits, wherein each of the V1 circuits generates another sum of weighted outputs of a subset of the RGC circuits, and an interface circuit configured to connect two or more of the V1 circuits to each other, wherein the two or more V1 circuits receive inputs from same RGC circuits of the plurality of RGC circuits.

Certain aspects of the present disclosure provide a method for implementing a neural system. The method generally includes generating, at an output of each Retinal Ganglion Cell (RGC) circuit of a plurality of RGC circuits in the neural system, a sum of weighted inputs from receptor circuits associated with that RGC circuit, generating, by each primary visual cortex cell (V1) circuit of a plurality of V1 circuits in the neural system, another sum of weighted outputs of a subset of the RGC circuits, and connecting two or more of the V1 circuits to each other, wherein the two or more V1 circuits receive inputs from same RGC circuits of the plurality of RGC circuits.

Certain aspects of the present disclosure provide an apparatus. The apparatus generally includes means for generating, at an output of each Retinal Ganglion Cell (RGC) circuit of a plurality of RGC circuits in the apparatus, a sum of weighted inputs from receptor circuits associated with that RGC circuit, means for generating, by each primary visual cortex cell (V1) circuit of a plurality of V1 circuits in the apparatus, another sum of weighted outputs of a subset of the RGC circuits, and means for connecting two or more of the V1 circuits to each other, wherein the two or more V1 circuits receive inputs from same RGC circuits of the plurality of RGC circuits.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
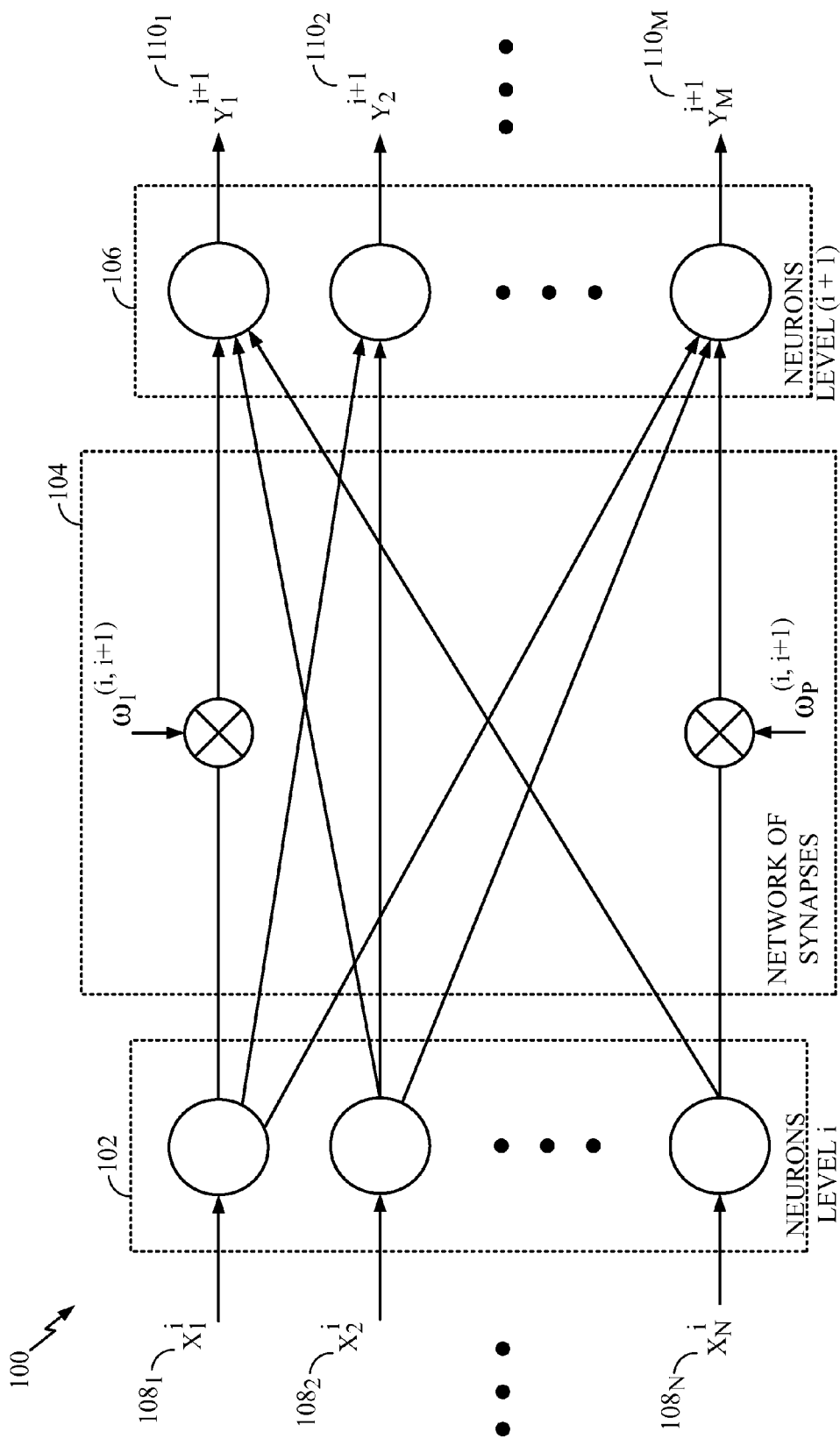
FIG. 1 illustrates an example neural system in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons, scale those signals according to adjustable synaptic weights $w_1^{(i,i+1)}, \ldots, w_P^{(i,i+1)}$ (where P is a total number of synaptic connections between the neurons of levels 102 and 106), and combine the scaled signals as an input signal of each neuron in the level 106. Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

The present disclosure proposes a simplified structure of primary visual cortex (V1) simple cells and retinal ganglion cells (RGCs) utilized for color vision, wherein the V1 cells and RGCs may be implemented as neuron circuits of the neural system 100 from FIG. 1. In an aspect, the RGCs may correspond to the neurons 102, and the V1 cells may correspond to the neurons 106. The present disclosure further proposes an efficient method of training connectivity between these two layers of cells (i.e., training of weights associated with the synapses 104) that leads to an autonomous formation of feature detectors (simple cells) within the V1 layer. The proposed approach enables a hardware-efficient and biological-plausible implementation of image recognition and motion detection systems.

According to certain aspects, the Izhikevich neuron model, the Spike-Timing Dependent Plasticity (STDP) training method, and the Gaussian windowing functions may be utilized for the RGC-to-V1 excitatory connections and for the lateral V1 inhibitory connections. However, all of these features may be very hard to implement in hardware, and may lead to a very large hardware size, preventing from integration of a desired number of synapses on a single chip. The other main drawback of this approach is that only one feature detector may be formed for a given location within the visual field.

A method proposed in the present disclosure may avoid the aforementioned drawbacks, and it may achieve the same emergence of V1 simple cells. In an aspect of the present disclosure, add-and-fire neurons may be utilized in combination with a training method much simpler than the STDP. Further, the Gaussian window function applied on RGC-to-V1 synapse weights may be replaced with a flat window function, a Gaussian-windowed inhibition within the V1 layer may be optional, and several V1 layers with a winner-take-all inhibition between them may be added and connected in parallel. The addition of parallel V1 layers may lead to formation of several feature detectors for each location within a visual field.

Training and Operation of Primary Visual Cortex Cells

According to certain aspects, RG cells (RGCs) may be divided into ON-cells and OFF-cells. The ON-cells can distinguish objects that are brighter than a background. For example, peripheral vision is all based on ON-cells, so that humans can better see bright spots against a dark background. On the other hand, RG OFF-cells can distinguish objects that are darker than a background. It should be noted that illuminating the entire receptive field comprising both RG ON-cells and RG OFF-cells has a limited effect on RGC firing rate.

Figure 2:
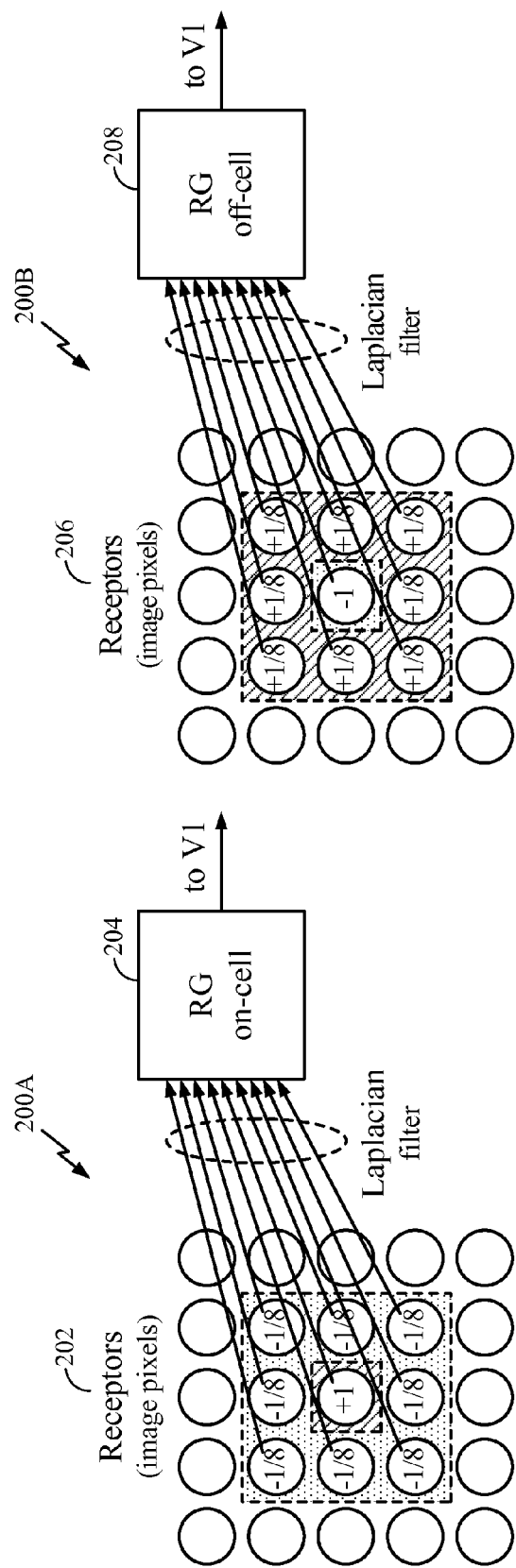
FIG. 2 illustrates an example model of receptors connected with different types of Retinal Ganglion (RG) cells in accordance with certain aspects of the present disclosure.

FIG. 2 illustrates an example model 200a of connection between photo-receptors 202 and an RG ON-cell 204, and an example model 200b of connection between photo-receptors 206 and an RG OFF-cell 208 in accordance with certain aspects of the present disclosure. The receptor circuits 202 and 206 may be organized as orthogonal arrays of image pixels. Therefore, receptive fields of ON- and OFF-cells may have a rectangular shape (instead of circular).

In an aspect, each RGC may receive input from nine receptors, wherein input weights associated with the receptors may form a Laplacian filter (i.e., a Laplacian window function may be applied on signals from the receptors), as illustrated in FIG. 2. The weights may depend on whether the receptors are connected to ON- or OFF-RG cells, as illustrated in the models 200a and 200b. It should be noted that the RG cells 204 and 208 illustrated in FIG. 2 may not correspond to magno-ganglion cells, which are being able to receive inputs from a much larger number of receptors.

Figure 3:
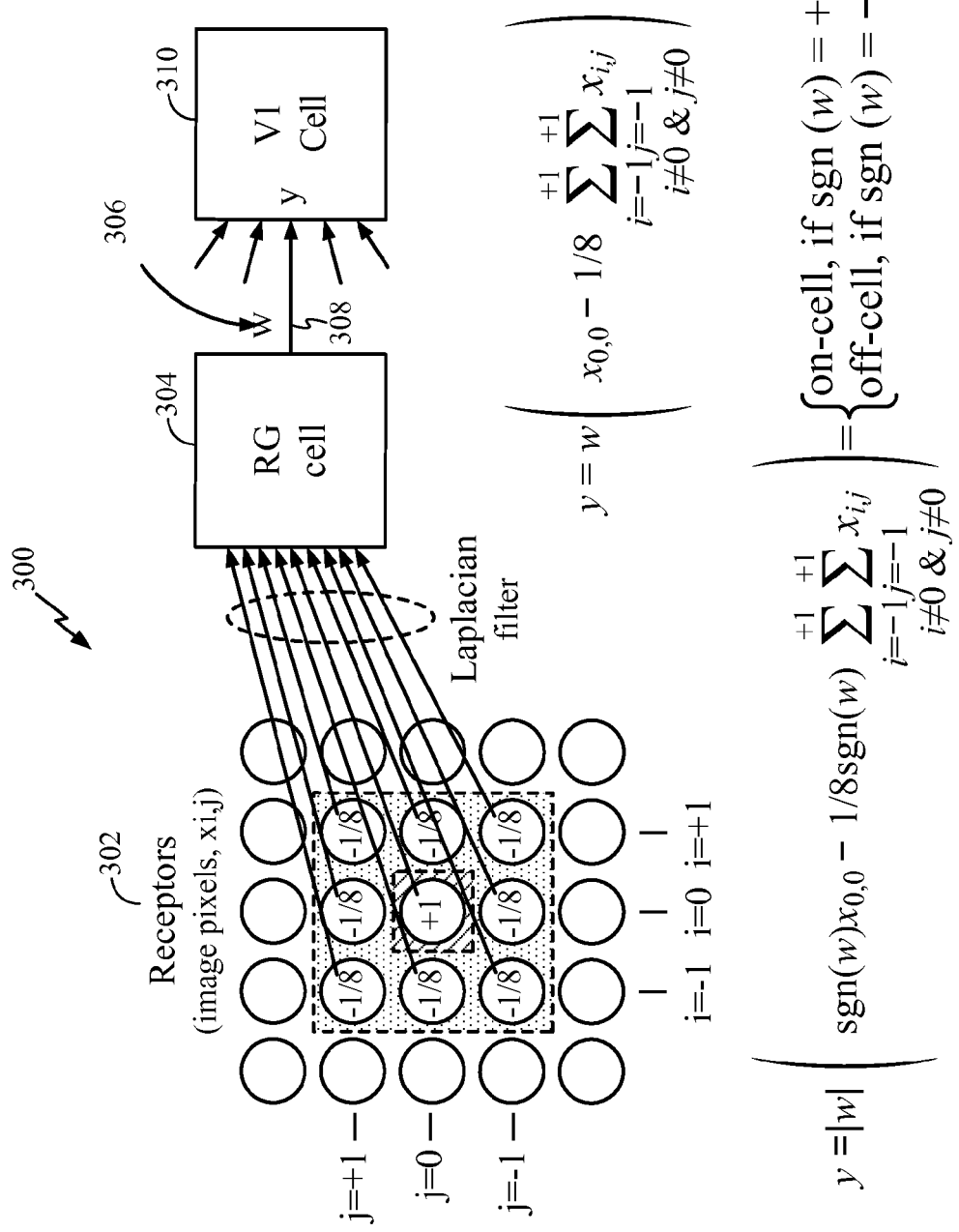
FIG. 3 illustrates an example model of receptors connected with an RG cell that may be ON-cell or OFF-cell depending on a sign of synapse connecting the RG cell and a primary visual cortex (V1) cell in accordance with certain aspects of the present disclosure.

In an aspect of the present disclosure, instead of mixing ON- and OFF-cells in the RGC array, each RG cell (e.g., an RG cell 304 receiving inputs from receptors 302 in a model 300 illustrated in FIG. 3) may be either ON or OFF cell depending on a sign of weight 306 associated with a synapse 308 connecting the RG cell 304 to a V1 simple cell 310. In other words, co-located ON and OFF RG cells may be modeled with a single RG cell (e.g., the RG cell 304) and with bipolar weights of synapses connecting this RG cell to V1 cells.

As illustrated in FIG. 3, an input y of the V1 cell 310 may be obtained by applying a weight w on input signals $x_{i,j}$ from the receptors 302 that may be input into the RG cell 304:

$$y = w \cdot \left( x_{0,0} - 1/8 \cdot \sum_{\substack{i=-1 \\ i \neq 0 \& j \neq 0}}^{+1} \sum_{j=-1}^{+1} x_{i,j} \right). \quad (1)$$

Equation (1) may be rewritten as:

$$y = |w| \cdot \left( \mathrm{sgn}(w) x_{0,0} - 1/8 \cdot \mathrm{sgn}(w) \cdot \sum_{\substack{i=-1 \\ i \neq 0 \& j \neq 0}}^{+1} \sum_{j=-1}^{+1} x_{i,j} \right), \quad (2)$$

wherein if sgn(w)=+1 then the RGC 304 may operate as an ON-cell, and if sgn(w)=−1 then the RGC 304 may operate as an OFF-cell.

Figure 4:
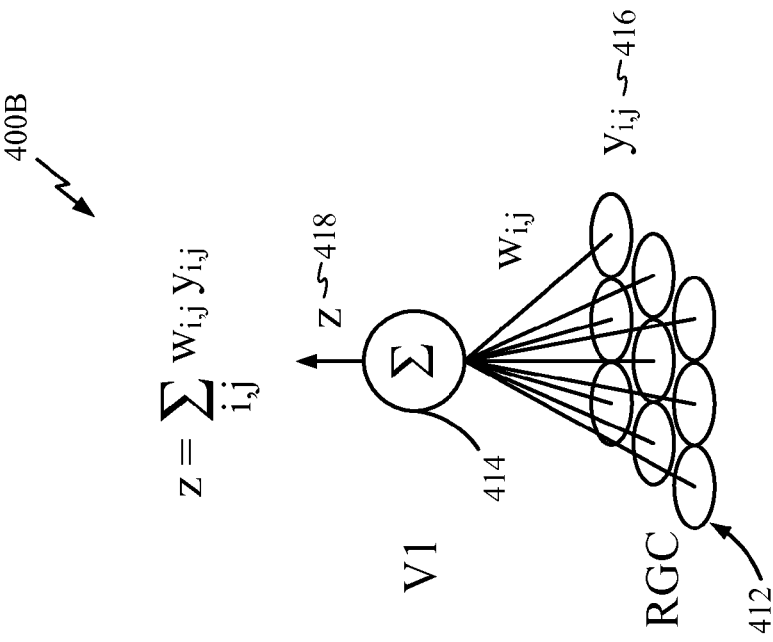
FIG. 4 illustrates an example model of connection between receptors and an RG cell and an example model of connection between RG cells and a V1 cell in accordance with certain aspects of the present disclosure.
Figure 4:
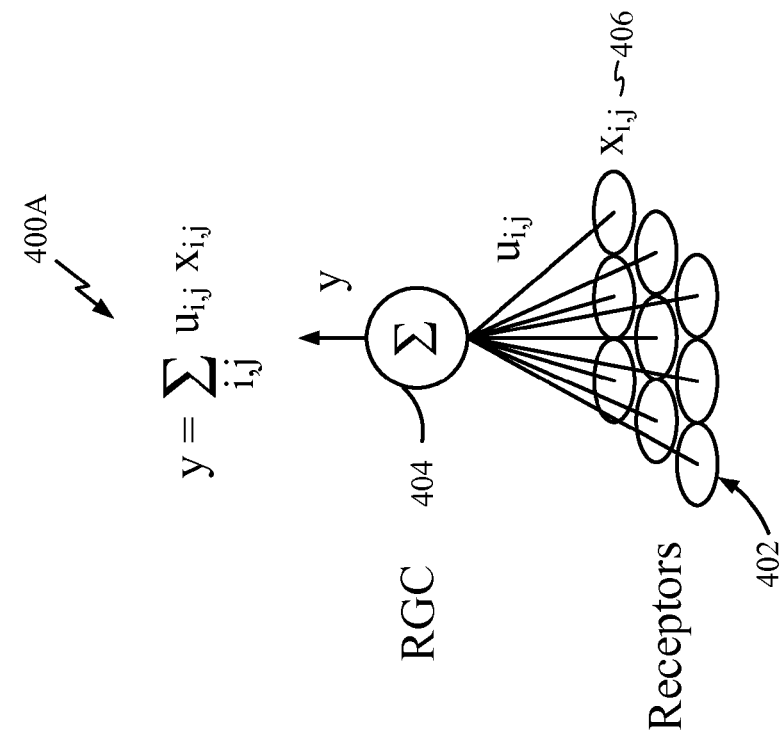

In an aspect of the present disclosure, a neuron model as the one illustrated in FIG. 4 may be utilized. In an example model 400a, an RGC 404 may sum its weighted inputs 406 from receptors 402, and then it may transfer the summation result to its output 408, i.e.:

$$y = \sum_{i,j} u_{i,j} \cdot x_{i,j}. \quad (3)$$

As illustrated in an example model 400b in FIG. 4, a V1 cell 414 may sum its weighted inputs 416 from RGCs 412, i.e.:

$$z = \sum_{i,j} w_{i,j} \cdot y_{i,j}, \quad (4)$$

where each of the weights $w_{i,j}$ from equation (4) may be bipolar for modeling both ON and OFF RGCs. In an aspect, an output 418 (activation signal) of the V1 cell 414 may be compared with a threshold. If the summation result 418 is above the threshold, then the V1 cell 414 is activated (i.e., fires). On the other hand, if the result 418 is below the threshold, then the V1 cell 414 is resting.

In an aspect of the present disclosure, only weights of RGC-to-V1 connections (i.e., the weights $w_{i,j}$) may be trained. The model 400b from FIG. 4 may utilize the following rule. The activation of each V1 simple cell may be calculated as the weighted sum of the corresponding RGC outputs. If the V1-cell activation exceeds a threshold, then the V1 cell may fire. Otherwise, the V1 cell may rest (i.e., the V1 cell does not generate any signal) and its input weights may not change.

In an aspect, if a V1 cell fires, then its weights may be adjusted according to signs of RGC outputs connected with the firing V1 cell. For example, if one of the RGC outputs is positive, a positive increment may be added to one of the weights corresponding to that RGC output (i.e., the weight may be increased). On the other hand, if that RGC output is negative, then a positive increment may be subtracted from the corresponding weight (i.e., the weight may be decreased). According to this approach, the RGC-to-V1 weights may change their sign from positive to negative during this unsupervised learning.

For RGC outputs $y_{i,j}$, an activation of V1 cell may be determined as defined by equation (4). Then, RGC-to-V1 weights may be, for example, adjusted as:

$$w_{i,j}^{new} = \begin{cases} w_{i,j}^{old}, & \text{if } z \leq \text{threshold} \\ w_{i,j}^{old} + \mathrm{sgn}(y_{i,j}) \cdot |\Delta w|, & \text{if } z > \text{threshold} \end{cases} \quad (5)$$

In an aspect of the present disclosure, a neural model may utilize lateral inhibition in V1 cells, which may decay with distance according to the Gaussian function. By applying this, the receptive fields of adjacent V1 cells may tune to different orientations. However, the adjacent V1 cells may not receive all their inputs from same RG cells, and their receptive fields can therefore still have the same orientation. For example, receptive fields of two adjacent V1 cells may have zero cross-correlation despite having the same orientation. Hence, mutual inhibition of the V1 cells may not prevent these receptive fields from formation. Simulations using the proposed simplified model illustrated in FIG. 4 show that the lateral inhibition may not be required.

Mutual Inhibition of Parallel Primary Visual Cortex (V1) Cells

Figure 5:
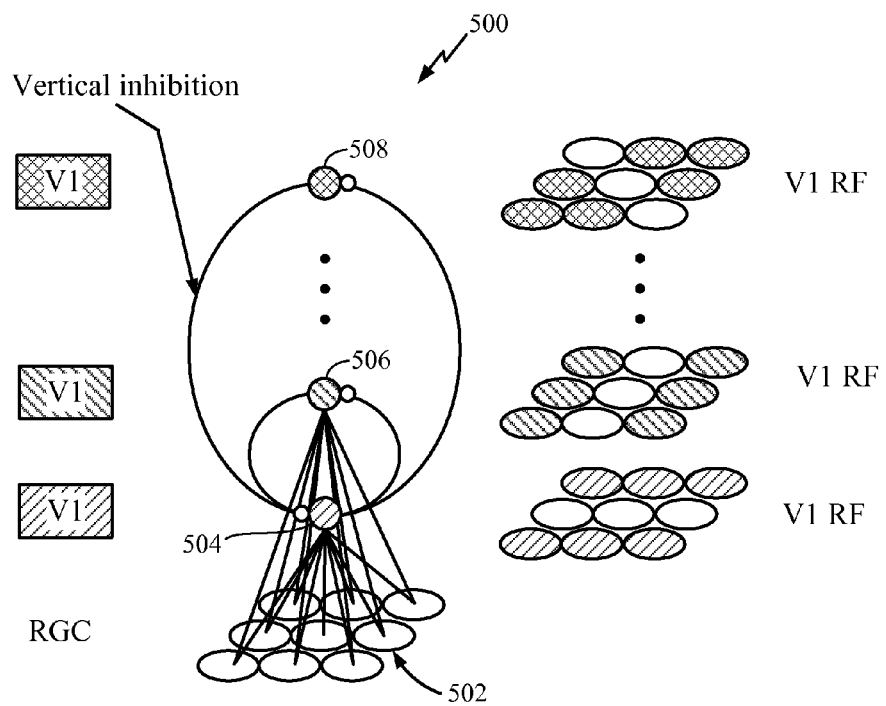
FIG. 5 illustrates an example parallel V1 layers connected to same RG cells and to each other for achieving vertical inhibition in a neural system in accordance with certain aspects of the present disclosure.
Figure 5:
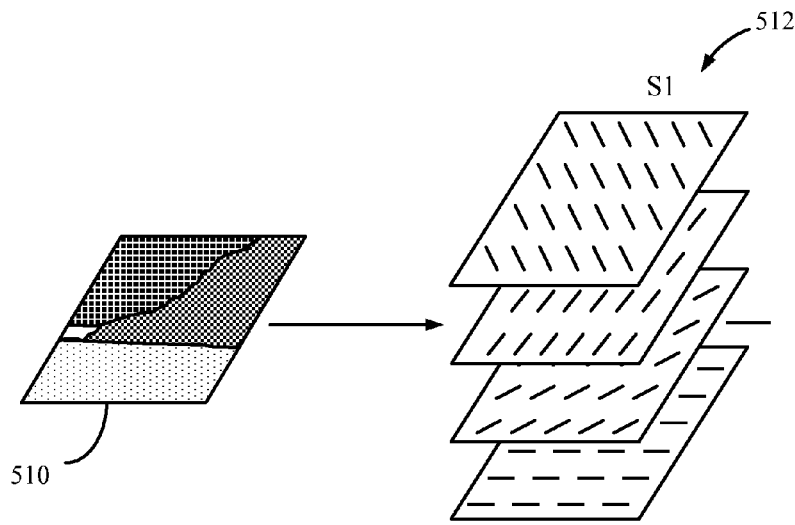

Certain aspects of the present disclosure support creating V1 feature detectors of different orientations for each RGC region. FIG. 5 illustrates an example model 500 where several parallel V1 layers of cells 504, 506, 508 may be included, while being connected to same RG cells 502 and to each other. Therefore, the connections between V1 layers may be such that only V1 cells, receiving inputs from the same RG cells, may be connected.

In an aspect, the connections between "vertical" V1 cells (e.g., the V1 cells 504, 506, 508 from FIG. 5) receiving inputs from the same RG cells (e.g., the RG cells 502) may be designed as mutually inhibitory to enable "Winner-Takes-All" (WTA) competition. In other words, the mutual inhibition may exist among the V1 cells connected to the same RG cells, and this inhibition may be implemented as the WTA competition preventing the "vertical" V1 simple cells from having the same receptive field, as illustrated in FIG. 5. In one aspect, lateral inhibition within each V1 layer may be included. By designing parallel V1 layers of cells, a comprehensive set of filters 512 covering the same RGC location 510 may be effectively obtained. In this way, only one of the filters 512 may fire at a time.

Figure 6:
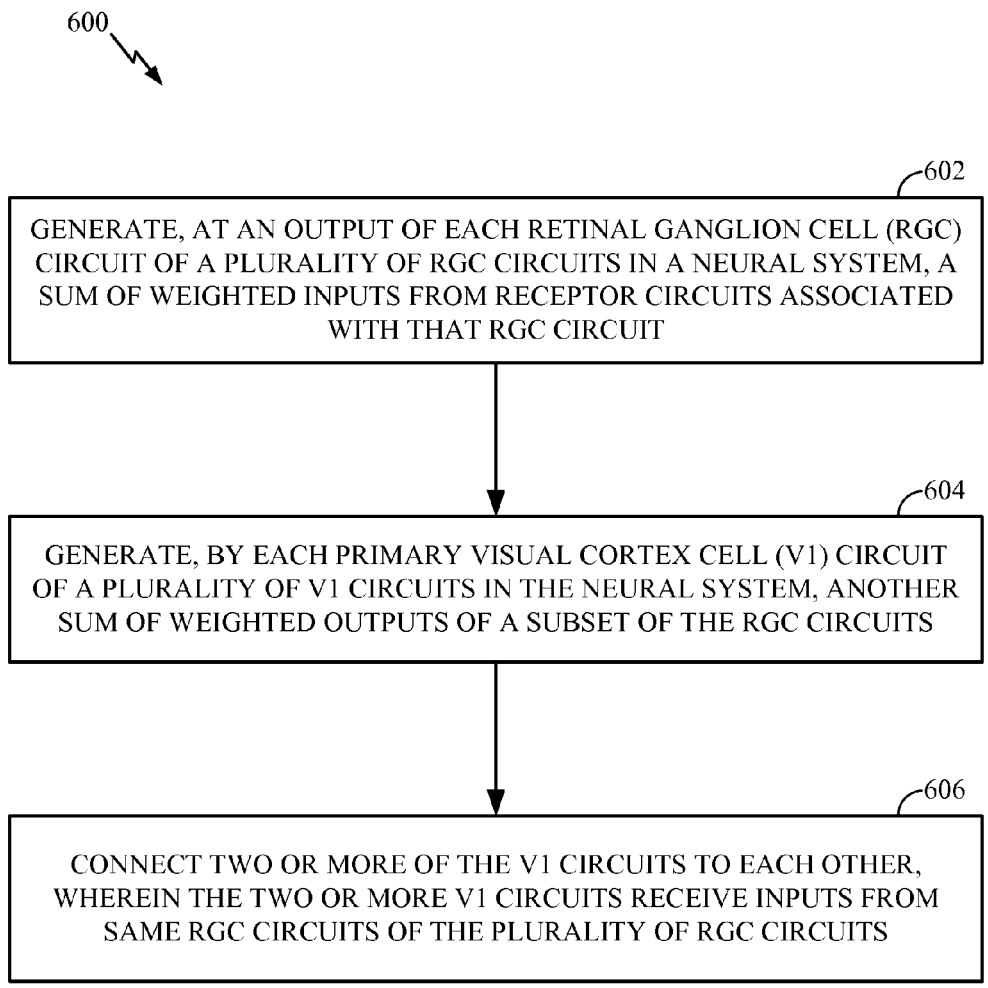
FIG. 6 illustrates example operations that may be performed at a neural system in accordance with certain aspects of the present disclosure.

FIG. 6 illustrates example operations 600 that may be performed at a neural system in accordance with certain aspects of the present disclosure. At 602, at an output of each Retinal Ganglion Cell (RGC) circuit of a plurality of RGC circuits in the neural system, a sum of weighted inputs from receptor circuits associated with that RGC circuit may be generated. At 604, each primary visual cortex cell (V1) circuit of a plurality of V1 circuits in the neural system may generate another sum of weighted outputs of a subset of the RGC circuits. In an aspect, a weight connecting one of the RGC circuits from the subset with that V1 circuit may be positive when modeling that RGC circuit from the subset as an ON RGC, and the weight may be negative when modeling that RGC circuit as an OFF RGC. At 606, two or more of the V1 circuits may be connected to each other, wherein the two or more V1 circuits may receive inputs from same RGC circuits of the plurality of RGC circuits. In an aspect, the two or more V1 circuits receiving inputs from the same RGC circuits may inhibit each other in the WTA competition.

To summarize, instead of mixing ON- and OFF-cells in the RGC layer, it is proposed in the present disclosure to make them all ON/OFF cells and to control their type through signs of the RGC-to-V1 weights. In an aspect, the Gaussian window function for the RGC-to-V1 weights may be replaced with a flat window function. Simple "add" neurons may be utilized as RG cells, while "add-and-fire" neurons may be utilized as V1 simple cells, as illustrated in FIG. 4.

The proposed learning rule for RGC-to-V1 weights defined by equation (5) may be applied instead of the STDP learning rule. In an aspect of the present disclosure, the synapse weights may be allowed to change from positive (modeling a connection to ON RG cell) to negative (modeling a connection to OFF RG cell), and vice versa.

In an aspect, several parallel V1 layers may be added in a neural system model, wherein the parallel V1 layers may be connected to the same RG cells and to each other. The connections between V1 layers may be such that only V1 cells, receiving inputs from the same RG cells, are connected. Further, lateral inhibition in the V1 layers may not be required. Connections between the "vertical" V1 cells, receiving inputs from the same RG cells, may be mutually inhibitory to enable WTA competition, which may prevent the "vertical" V1 simple cells from having the same receptive field, as illustrated in FIG. 5.

Figure 6A:
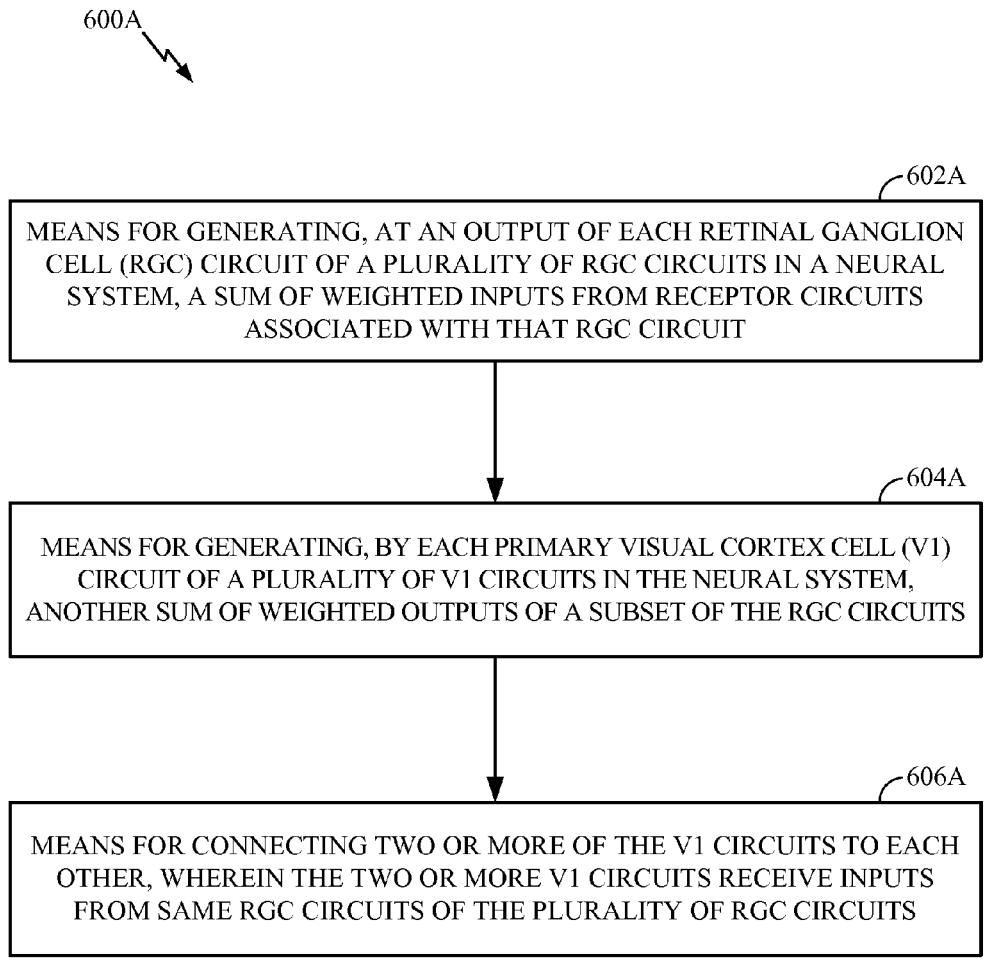
FIG. 6A illustrates example components capable of performing the operations illustrated in FIG. 6.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 600 illustrated in FIG. 6 correspond to components 600A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An electrical circuit, comprising:
  a plurality of Retinal Ganglion Cell (RGC) circuits, wherein each of the RGC circuits generates, at an output, a sum of weighted inputs from receptor circuits associated with that RGC circuit;
  a plurality of primary visual cortex cell (V1) circuits, wherein each of the V1 circuits generates another sum of weighted outputs of a subset of the RGC circuits; and
  an interface circuit configured to connect two or more of the V1 circuits to each other, wherein the two or more V1 circuits receive inputs from the same RGC circuits of the plurality of RGC circuits, wherein:
  a weight connecting one of the RGC circuits from the subset with that V1 circuit is positive when modeling that RGC circuit from the subset as an ON RGC, and
  the weight is negative when modeling that RGC circuit as an OFF RGC.

2. The electrical circuit of claim 1, wherein the two or more V1 circuits receiving inputs from the same RGC circuits inhibit each other.

3. The electrical circuit of claim 1, wherein the two or more V1 circuits receiving inputs from the same RGC circuits inhibit each other in a Winner-Take-All competition.

4. The electrical circuit of claim 1, wherein that V1 circuit generates a signal, if the other sum exceeds a threshold.

5. The electrical circuit of claim 1, further comprising:
  a circuit configured to adjust weights applied on the outputs for generating the other sum.

6. An electrical circuit, comprising:
  a plurality of Retinal Ganglion Cell (RGC) circuits, wherein each of the RGC circuits generates, at an output, a sum of weighted inputs from receptor circuits associated with that RGC circuit;
  a plurality of primary visual cortex cell (V1) circuits, wherein each of the V1 circuits generates another sum of weighted outputs of a subset of the RGC circuits;
  an interface circuit configured to connect two or more of the V1 circuits to each other, wherein the two or more V1 circuits receive inputs from the same RGC circuits of the plurality of RGC circuits; and
  a circuit configured to adjust weights applied on the outputs for generating the other sum,
  wherein the adjustment of each of the weights is based on a sign of one of the outputs associated with that weight.

7. The electrical circuit of claim 6, wherein:
  that weight is increased, if the sign is positive, and
  that weight is decreased, if the sign is negative.

8. The electrical circuit of claim 1, wherein that V1 circuit does not generate any signal, if the other sum does not exceed a threshold.

9. An electrical circuit, comprising:
  a plurality of Retinal Ganglion Cell (RGC) circuits, wherein each of the RGC circuits generates, at an output, a sum of weighted inputs from receptor circuits associated with that RGC circuit;
  a plurality of primary visual cortex cell (V1) circuits, wherein each of the V1 circuits generates another sum of weighted outputs of a subset of the RGC circuits; and
  an interface circuit configured to connect two or more of the V1 circuits to each other, wherein the two or more V1 circuits receive inputs from the same RGC circuits of the plurality of RGC circuits,
  wherein the inputs from the receptor circuits are weighted according to a Laplacian window function.

10. A method for implementing a neural system, comprising:
  generating, at an output of each Retinal Ganglion Cell (RGC) circuit of a plurality of RGC circuits in the neural system, a sum of weighted inputs from receptor circuits associated with that RGC circuit;
  generating, by each primary visual cortex cell (V1) circuit of a plurality of V1 circuits in the neural system, another sum of weighted outputs of a subset of the RGC circuits; and
  connecting two or more of the V1 circuits to each other, wherein the two or more V1 circuits receive inputs from the same RGC circuits of the plurality of RGC circuits, wherein:
  a weight connecting one of the RGC circuits from the subset with that V1 circuit is positive when modeling that RGC circuit from the subset as an ON RGC, and
  the weight is negative when modeling that RGC circuit as an OFF RGC.

11. The method of claim 10, wherein the two or more V1 circuits receiving inputs from the same RGC circuits inhibit each other.

12. The method of claim 10, wherein the two or more V1 circuits receiving inputs from the same RGC circuits inhibit each other in a Winner-Take-All competition.

13. The method of claim 10, further comprising:
generating a signal by that V1 circuit, if the other sum exceeds a threshold.

14. The method of claim 10, further comprising:
adjusting weights applied on the outputs for generating the other sum.

15. A method for implementing a neural system, comprising:
generating, at an output of each Retinal Ganglion Cell (RGC) circuit of a plurality of RGC circuits in the neural system, a sum of weighted inputs from receptor circuits associated with that RGC circuit;
generating, by each primary visual cortex cell (V1) circuit of a plurality of V1 circuits in the neural system, another sum of weighted outputs of a subset of the RGC circuits;
connecting two or more of the V1 circuits to each other, wherein the two or more V1 circuits receive inputs from the same RGC circuits of the plurality of RGC circuits; and
adjusting weights applied on the outputs for generating the other sum,
wherein the adjustment of each of the weights is based on a sign of one of the outputs associated with that weight.

16. The method of claim 15, wherein:
that weight is increased, if the sign is positive, and
that weight is decreased, if the sign is negative.

17. The method of claim 10, wherein that V1 circuit does not generate any signal, if the other sum does not exceed a threshold.

18. A method for implementing a neural system, comprising:
generating, at an output of each Retinal Ganglion Cell (RGC) circuit of a plurality of RGC circuits in the neural system, a sum of weighted inputs from receptor circuits associated with that RGC circuit;
generating, by each primary visual cortex cell (V1) circuit of a plurality of V1 circuits in the neural system, another sum of weighted outputs of a subset of the RGC circuits; and
connecting two or more of the V1 circuits to each other, wherein the two or more V1 circuits receive inputs from the same RGC circuits of the plurality of RGC circuits,
wherein the inputs from the receptor circuits are weighted according to a Laplacian window function.

19. An apparatus, comprising:
means for generating, at an output of each Retinal Ganglion Cell (RGC) circuit of a plurality of RGC circuits in the apparatus, a sum of weighted inputs from receptor circuits associated with that RGC circuit;
means for generating, by each primary visual cortex cell (V1) circuit of a plurality of V1 circuits in the apparatus, another sum of weighted outputs of a subset of the RGC circuits; and
means for connecting two or more of the V1 circuits to each other, wherein the two or more V1 circuits receive inputs from the same RGC circuits of the plurality of RGC circuits, wherein
a weight connecting one of the RGC circuits from the subset with that V1 circuit is positive when modeling that RGC circuit from the subset as an ON RGC, and the weight is negative when modeling that RGC circuit as an OFF RGC.

20. The apparatus of claim 19, wherein the two or more V1 circuits receiving inputs from the same RGC circuits inhibit each other.

21. The apparatus of claim 19, wherein the two or more V1 circuits receiving inputs from the same RGC circuits inhibit each other in a Winner-Take-All competition.

22. The apparatus of claim 19, further comprising:
means for generating a signal by that V1 circuit, if the other sum exceeds a threshold.

23. The apparatus of claim 19, further comprising:
means for adjusting weights applied on the outputs for generating the other sum.

24. An apparatus, comprising:
means for generating, at an output of each Retinal Ganglion Cell (RGC) circuit of a plurality of RGC circuits in the apparatus, a sum of weighted inputs from receptor circuits associated with that RGC circuit;
means for generating, by each primary visual cortex cell (V1) circuit of a plurality of V1 circuits in the apparatus, another sum of weighted outputs of a subset of the RGC circuits;
means for connecting two or more of the V1 circuits to each other, wherein the two or more V1 circuits receive inputs from the same RGC circuits of the plurality of RGC circuits; and
means for adjusting weights applied on the outputs for generating the other sum,
wherein the adjustment of each of the weights is based on a sign of one of the outputs associated with that weight.

25. The apparatus of claim 24, wherein:
that weight is increased, if the sign is positive, and
that weight is decreased, if the sign is negative.

26. The apparatus of claim 19, wherein that V1 circuit does not generate any signal, if the other sum does not exceed a threshold.

27. An apparatus, comprising:
means for generating, at an output of each Retinal Ganglion Cell (RGC) circuit of a plurality of RGC circuits in the apparatus, a sum of weighted inputs from receptor circuits associated with that RGC circuit;
means for generating, by each primary visual cortex cell (V1) circuit of a plurality of V1 circuits in the apparatus, another sum of weighted outputs of a subset of the RGC circuits; and
means for connecting two or more of the V1 circuits to each other, wherein the two or more V1 circuits receive inputs from the same RGC circuits of the plurality of RGC circuits,
wherein the inputs from the receptor circuits are weighted according to a Laplacian window function.

28. A computer program product of a neural system, comprising a non-transitory computer-readable medium comprising code for:
generating, at an output of each Retinal Ganglion Cell (RGC) circuit of a plurality of RGC circuits in the neural system, a sum of weighted inputs from receptor circuits associated with that RGC circuit;
generating, by each primary visual cortex cell (V1) circuit of a plurality of V1 circuits in the neural system, another sum of weighted outputs of a subset of the RGC circuits; and
connecting two or more of the V1 circuits to each other, wherein the two or more V1 circuits receive inputs from the same RGC circuits of the plurality of RGC circuits, wherein a weight connecting one of the RGC circuits from the subset with that V1 circuit is positive when modeling that RGC circuit from the subset as an ON RGC, and the weight is negative when modeling that RGC circuit as an OFF RGC.

29. The computer program product of claim 28, wherein the two or more V1 circuits receiving inputs from the same RGC circuits inhibit each other.

30. The computer program product of claim 28, wherein the two or more V1 circuits receiving inputs from the same RGC circuits inhibit each other in a Winner-Take-All competition.

31. The computer program product of claim 28, wherein the computer-readable medium further comprises code for:

generating a signal by that V1 circuit, if the other sum exceeds a threshold.

32. The computer program product of claim 28, wherein the computer-readable medium further comprises code for:

adjusting weights applied on the outputs for generating the other sum.

33. A computer program product of a neural system, comprising a non-transitory computer-readable medium comprising code for:

generating, at an output of each Retinal Ganglion Cell (RGC) circuit of a plurality of RGC circuits in the neural system, a sum of weighted inputs from receptor circuits associated with that RGC circuit;

generating, by each primary visual cortex cell (V1) circuit of a plurality of V1 circuits in the neural system, another sum of weighted outputs of a subset of the RGC circuits;

connecting two or more of the V1 circuits to each other, wherein the two or more V1 circuits receive inputs from the same RGC circuits of the plurality of RGC circuits; and adjusting weights applied on the outputs for generating the other sum, wherein the adjustment of each of the weights is based on a sign of one of the outputs associated with that weight.

34. The computer program product of claim 33, wherein:

that weight is increased, if the sign is positive, and that weight is decreased, if the sign is negative.

35. The computer program product of claim 28, wherein that V1 circuit does not generate any signal, if the other sum does not exceed a threshold.

36. A computer program product of a neural system, comprising a non-transitory computer-readable medium comprising code for:

generating, at an output of each Retinal Ganglion Cell (RGC) circuit of a plurality of RGC circuits in the neural system, a sum of weighted inputs from receptor circuits associated with that RGC circuit;

generating, by each primary visual cortex cell (V1) circuit of a plurality of V1 circuits in the neural system, another sum of weighted outputs of a subset of the RGC circuits; and connecting two or more of the V1 circuits to each other, wherein the two or more V1 circuits receive inputs from the same RGC circuits of the plurality of RGC circuits, wherein the inputs from the receptor circuits are weighted according to a Laplacian window function.

* * * * *